Figure 1:
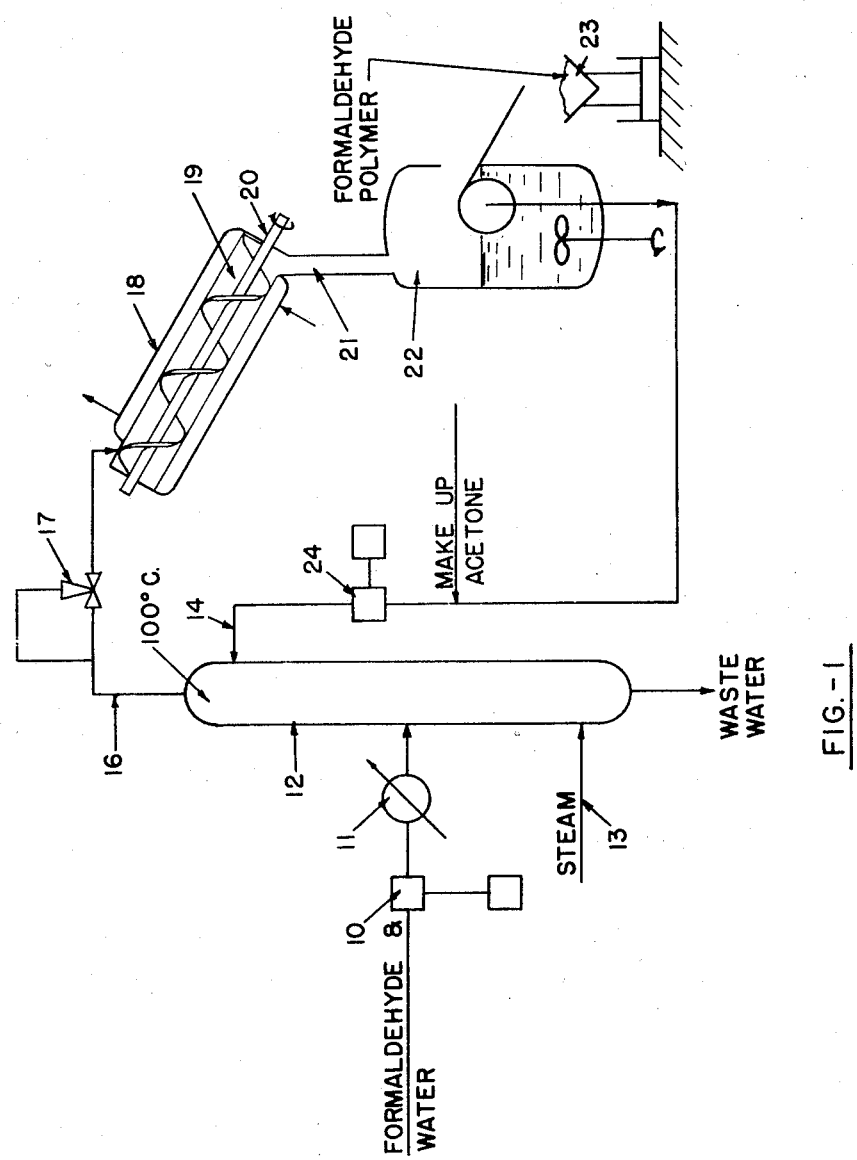

Aug. 28, 1951     J. F. McCANTS     2,565,568
FORMALDEHYDE PURIFICATION

Filed Nov. 5, 1948     2 Sheets-Sheet 1

JAMES F. McCANTS
*INVENTOR.*

BY Buell B. Hamilton
PATENT AGENT

Aug. 28, 1951  J. F. McCANTS  2,565,568
FORMALDEHYDE PURIFICATION
Filed Nov. 5, 1948  2 Sheets-Sheet 2

JAMES F. McCANTS
*INVENTOR.*

BY *Buell B. Hamilton*
PATENT AGENT

Patented Aug. 28, 1951

2,565,568

UNITED STATES PATENT OFFICE 2,565,568

FORMALDEHYDE PURIFICATION

James F. McCants, Tulsa, Okla.

Application November 5, 1948, Serial No. 58,593

11 Claims. (Cl. 202—40)

This invention relates to the purification of formaldehyde, and more particularly to the separation of formaldehyde from mixtures thereof with water.

My invention broadly comprises the fractional distillation of an aqueous solution of formaldehyde at elevated temperature and pressure in the presence of an acetone reflux, whereby a formaldehyde distillate fraction may be withdrawn in substantially anhydrous condition, or with a substantially diminished proportion of water.

In most commercial processes for the manufacture of formaldehyde, a large quantity of water is simultaneously produced, together with smaller quantities of various organic impurities, such as aldehydes, acids, acetals, alcohols, ketones, and the like. The isolation of formaldehyde from the crude reaction product is an important and difficult undertaking, particularly when the formaldehyde is produced by certain processes, such as the oxidation of gaseous petroleum fractions, in which the crude formaldehyde is obtained in relatively dilute aqueous solution together with a relatively high proportion of organic impurities. Various methods have been disclosed in the prior art for effecting the desired separation and purification. For example, by distilling a solution of formaldehyde and subjecting the vaporous distillate to partial condensation, an overhead product enriched in formaldehyde content may be obtained. In actual practice, however, it has never been possible to achieve more than a partial concentration and purification of formaldehyde in this way, and serious trouble is generally encountered from the formation of solid formaldehyde polymers in excessive amounts on the cool surface of the partial condenser. Another method involves the use of vacuum distillation to remove water and low-boiling organic impurities overhead, leaving a formaldehyde concentrate in the distillation bottoms. This method is also incapable of producing anhydrous formaldehyde, and it is incapable of removing such impurities as acetic and formic acids and dissolved inorganic compounds. In another process, an azeotroping agent, such as ethyl acetate, is used to distill water out of the aqueous formaldehyde solution. This method is capable of giving a more nearly anhydrous formaldehyde product; but like vacuum distillation, it is incapable of separating non-volatile impurities. Pressure distillation is a highly advantageous method, in that the formaldehyde is collected as an overhead product; thus, relatively dilute solutions may be processed economically because of the low heat requirements of the process. Unfortunately, however, adequate fractionation is not feasible, owing to the fact that a liquid formaldehyde reflux cannot be provided. Moreover, the utility of the process is limited by the fact that excessively high temperatures tend to destroy much of the formaldehyde through a Canizzaro-type reaction.

An object of my invention is to provide a superior means for purifying and concentrating formaldehyde. Another object of my invention is to provide a method for selectively removing formaldehyde from mixtures thereof with water. A further object of my invention is to provide a means for preparing formaldehyde in substantially anhydrous condition. A still further object of my invention is to prepare a solid polymeric form of formaldehyde having desirable mechanical properties and high water solubility. Other objects of my invention and its advantages over the prior art will be apparent from the following description and examples.

Figure 2:
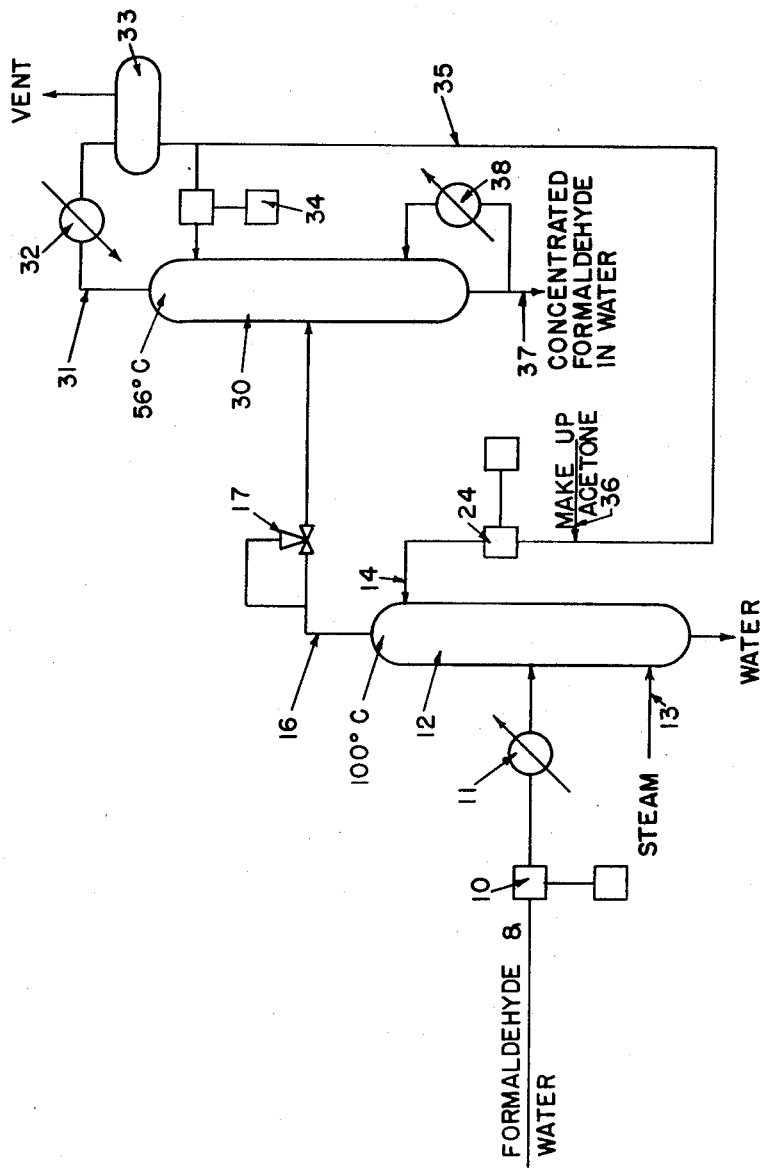

Figures 1 and 2 are plan sheets illustrating two embodiments of my invention. The same reference numbers in both figures refer to the same or corresponding parts.

In general in my process an aqueous solution of formaldehyde is fractionally distilled in the presence of acetone, the temperature at the top of the column being above about 80° C., and the pressure being sufficient to cause condensation of the acetone at the top temperature employed. Preferably the acetone is added to the top of the column as reflux. Under these conditions a distillate is obtained comprising substantially anhydrous vapors of acetone and formaldehyde. When the vapors are cooled, the acetone condenses, and the formaldehyde is found to dissolve in the liquid acetone. Upon further cooling, the formaldehyde rapidly polymerizes and precipitates from the acetone. The precipitate can then be recovered by decanting the acetone, or by filtration. Acetone remaining on the precipitate is easily removed by vacuum or air drying.

I believe the theory of my process to be as follows, although it will be understood that this theory does not in any way limit the scope of my invention. If an aqueous solution of formaldehyde is heated to a temperature above about 80° C. the formaldehyde is found to depolymerize to a considerable extent and the resulting monomeric hydrate decomposes rapidly resulting in a considerable vapor pressure of formaldehyde in equilibrium with the liquid water. As the temperature is increased further the vapor pressure of formaldehyde increases more rapidly than does the vapor pressure of water. Pressure distillation of formaldehyde solutions takes advantage of this factor.

In ordinary pressure distillation this vapor of increased ratio of formaldehyde to water is taken overhead and condensed to produce a formaldehyde more concentrated than the feed. In my process the mixture of water vapor and formaldehyde vapor pass up the column and meet a downwardly flowing reflux of acetone provided by introducing a liquid acetone reflux into the top of the column or by otherwise cooling the top of the column. Water vapor is condensed by the liquid acetone reflux resulting in vaporization of the acetone so that the water vapor is replaced by acetone vapor as the vapors rise through the column. From the top of the column a substantially water-free stream of acetone containing a high concentration of formaldehyde is withdrawn in liquid or vapor form.

The process appears to depend for its success on refluxing back the water at a temperature at which there exists a considerable vapor pressure of formaldehyde over the liquid water. Hence, when a "top temperature" above about 80° C. is referred to, it will be understood that this is the temperature at the highest point in the column at which liquid water exists. Above that point the temperature can be any desired practical value. As a practical matter if the fractionating column is operated efficiently, liquid water will appear near the top of the column, so the actual top temperature will closely approach the "top temperature" referred to above.

The pressure employed will generally be that pressure necessary to give the desired temperature in the distillation column. In some cases, however, it is desirable to control the pressure according to other factors. If it is desired, for example, to permit a controlled amount of water to pass overhead, it may be desirable to operate at a selected pressure above 37 pounds per square inch, absolute. At pressures above 37 pounds per square inch, absolute, acetone and water form an azeotrope. The water content of this azeotrope can be adjusted to almost any desired value. For example, the water content can be adjusted to a value between 0 and about 10 mol percent by controlling the pressure between about 37 and about 80 pounds per square inch absolute. Thus, control of the pressure of the distilling column affords a convenient manner of controlling the desired water content of the overhead product. Of course, the same result can also be obtained by, for example, decreasing the acetone reflux until water begins to appear in the distillate. This means is particularly applicable to pressures below 37 p. s. i. a. The azeotrope affords a much better control of the amount of water taken overhead, particularly when only a small amount of water is desired.

The reason for taking water overhead may be to control the rate of polymerization of formaldehyde in the acetone, to control the solubility of the formaldehyde in the condensed acetone, and particularly to control the water-solubility of the resulting polymer. If no water is present, very large polymer molecules are generally formed. These tend to be less easily dissolved in water than do the smaller polymer molecules. Thus, it may be desirable to control the amount of water taken overhead as described above to produce a polymer containing up to around 10 percent water. It will be understood that the term "substantially water-free" used hereinafter refers to streams which may contain up to about 10 percent as much water as formaldehyde.

In carrying out my process batchwise, a conventional pressure still may be used, comprising a kettle equipped with indirect heating means, a packed or bubble-cap fractionating column, a condenser, a reflux drum, and a pressure-reduction valve or valves for withdrawal of a portion of the overhead stream, either before or after condensation. Suitable vapor and liquid lines are provided between various items of equipment, and conventional control means are provided for regulating the pressure within the still, for example by regulating the heat input to the still kettle. The charging stock, comprising water and formaldehyde, and preferably a quantity of acetone, are introduced into the still kettle. Heat is then applied to the contents of the kettle, and the still is brought to reflux at the desired temperature and pressure. The system is operated at total reflux until equilibrium has been established. Withdrawal of the overhead product is then started at a rate sufficiently low to maintain the withdrawn material in anhydrous form, or with not more than the desired maximum proportion of water. As the distillation proceeds, additional quantities of acetone may be introduced into the system, directly into the still kettle, if desired, or preferably into the top or an intermediate point of the fractionating column. The proportion of acetone within the system should be maintained at such a level at all times that the temperature of the vapor stream at the top of the fractionating column is not substantially greater than the boiling point of acetone under the pressure employed in the process. The distillation is continued until substantially all of the formaldehyde has been volatilized from the still kettle and taken off overhead. Thereafter, any quantity of acetone remaining in the system is fractionally distilled and withdrawn, and the distillation is discontinued.

In a preferred embodiment of my invention, the purified formaldehyde-acetone distillate, either in the form of vapor or liquid, is discharged into a cooled receiver, where rapid polymerization and precipitation of solid formaldehyde takes place. The resulting slurry of formaldehyde polymer in acetone is withdrawn and filtered, and the solid is readily and conveniently freed from acetone by vacuum or air drying. The dried solid obtained thereby is a valuable material, of superior utility in many applications, owing to its high formaldehyde content, high water solubility and its freedom from non-volatile impurities such as metallic salts, organic acid salts, higher organic acids, and higher alcohols.

A preferred continuous embodiment of my invention is shown in the drawing. In this drawing an aqueous solution of formaldehyde is introduced by pump 10 through heater 11 into fractionating column 12. The liquid flows down the column and is stripped of formaldehyde by the heat of open steam introduced through line 13. One of the advantages of my process is that open steam can be used in place of a reboiler. In other processes for concentrating formaldehyde, use of open steam is undesirable because the bottoms stream always contains formaldehyde which is diluted by the condensed open steam. In my process substantially only waste water and impurities are present in the bottom of the column, so condensed steam does no harm.

Vapors of formaldehyde and water pass upwardly through the column and are met above the feed plate by a reflux of acetone introduced through line 14. As pointed out before, the top temperature should be sufficient to provide a high vapor pressure of formaldehyde over the liquid water condensed in the fractionating column. The top temperature should be above 80° C., suitably 100° C., as shown. The upper limit of temperature which can be employed depends upon the permissible increased rate of formaldehyde decomposition at higher temperatures and upon the permissible water content of the overhead product at the increased pressure required to condense the acetone at the higher temperatures.

A substantially anhydrous mixture of acetone and formaldehyde is withdrawn through line 16 in vapor or liquid state and passes through pressure-reducing valve 17 to cooler 18. Pressure-reducing valve 17 maintains a pressure in the top of column 12 sufficient to provide the desired top temperature. This pressure is typically maintained at about 50 to 60 pounds per square inch absolute depending upon the desired water content of the overhead from column 12.

Cooler 18 is equipped with a screw conveyor 19 driven by shaft 20. The screw conveyor scrapes polymer off the cooling walls. The polymer and acetone pass through line 21 to filter 22 which separates the polymer from the acetone. The polymer is sent as by cart 23 to drying ovens for removal of remaining acetone. The acetone from filter 22 is recycled by pump 24 through line 14 to column 12.

Although my process is particularly applicable to production of a solid formaldehyde polymer, it can also be employed advantageously to produce concentrated aqueous formaldehyde solutions from dilute solutions. It is, of course, a simple matter to dissolve the solid polymer in water in amounts necessary to give the desired strength solution. It is desirable, however, to avoid the solids-handling steps and equipment if a solid polymer is not the desired final product.

In Figure 2 illustrating an embodiment of my invention adapted to produce concentrated solutions of formaldehyde in water, the operation of column 12 is the same as described in connection with Figure 1 except that a larger ratio of water to formaldehyde is taken overhead preferably by reducing the quantity of reflux introduced into column 12 through line 14. Vapors leave the top of column 12 through line 16 and pressure reduction valve 17. This valve reduces the pressure of the vapors preferably to atmospheric pressure.

The vapors of acetone, water and formaldehyde pass through valve 17 to fractionating column 30. Due to the decreased operating pressure of this column, the top temperature is lower than in column 12. At atmospheric pressure, for example, the top temperature will be the boiling point of acetone at atmospheric pressure, which is about 56° C. as shown. This temperature is too low to permit much formaldehyde vapor to get past the portion of the column in which liquid water is present. Any top temperature up to about 80° C. is permissible. If temperatures below 56° C. are desired, the distillation in column 30 is carried out under a vacuum. If under certain operating conditions excessive amounts of formaldehyde are carried overhead with the acetone due to insufficient contact with liquid water in column 30, the vapors from valve 17 may be condensed to provide the necessary contact conditions to insure formaldehyde hydrate formation with liquid water.

Since the formaldehyde forms hydrates with the liquid water in the column at the low temperatures employed, the acetone leaving column 30 through line 31 is substantially free from formaldehyde. The acetone is condensed in cooler 32 and flows to reflux drum 33 from which part of the acetone is returned to column 30 as reflux by means of pump 34. The remainder of the acetone from drum 33 is recycled through line 35, pump 24, and line 14 to column 12 as reflux for that column. Make-up acetone is introduced through line 36. It will be noted that any small amount of formaldehyde passing out the top of column 30 with acetone is dissolved in the acetone and recycled to column 12.

The desired acetone-free concentrated solution of formaldehyde in water is withdrawn from the bottom of column 30 through line 37. Reboiler 38 is employed on column 30 to strip acetone from the bottoms product rather than open steam as used in column 12 since open steam in column 30 would be condensed and would dilute the concentrated aqueous solution of formaldehyde withdrawn through line 37.

The embodiment of my invention shown in Figure 2 can be conveniently combined with most prior art processes for concentrating formaldehyde with many resulting advantages.

As previously indicated, most prior art processes for concentrating formaldehyde solutions are objectionable since a considerable portion of formaldehyde is lost in a dilute water solution. Another objection is that unless a fairly concentrated feed is employed, it is difficult to obtain high yields of the formaldehyde as the 37 to 40 percent formalin of commerce.

In a combination of one of the prior art formaldehyde-concentrating processes with my process, the dilute stream from the prior art process is fed to a high-temperature acetone-refluxed column according to my invention, the process being carried out as shown in Figure 2. The quantity of water taken overhead from column 12 is regulated to produce a stream in line 37 from the bottom of column 30 of the proper concentration for blending with the concentrated formaldehyde stream from the prior art process to produce the 37 to 40 percent formalin of commerce, or any other desired concentration. Thus, the prior art process can be carried out at optimum conditions for heat conservation and for avoiding formaldehyde decomposition, recovering in some cases as much as 80 percent of the formaldehyde as a solution of considerably increased formaldehyde concentration. Thus, the prior art process greatly reduces the load on columns 12 and 30 of the process shown in Figure 2, while these columns recover the formaldehyde normally lost from the prior art process, and recover it in the form of a solution of the proper concentration to blend with the product from the prior art process to produce the 37 to 40 percent formalin of commerce or other desired concentrations.

My invention will be more fully understood from the following specific examples.

*Examples*

In each of the following experiments, acetone and an aqueous solution of formaldehyde were introduced into a one-liter distillation vessel, equipped with an internal electric heating element, regulated by means of an adjustable autotransformer. The mixture was distilled under pressure through an uninsulated fractionating column having an internal diameter of one inch and a height of approximately four feet. The pressures indicated in the table below were measured. The temperatures are estimated. The column was packed with ¼-inch Berl saddles. Reflux was provided by the naturally occurring condensation within the column, resulting from the fact that the column was not provided with thermal insulation. The vapors reaching the top of the column were expanded to atmospheric pressure through a valve into a cooled product receiver, where the acetone was totally condensed, and the formaldehyde underwent rapid polymerization. The resulting slurry (identified as "total product slurry" in the table below) was weighed, sampled, and analyzed. The formaldehyde polymer was separated from the slurry by filtration; and after being thoroughly dried under vacuum, it was sampled and analyzed. The results were as follows:

| Aqueous formaldehyde: | | | | | | |
|---|---|---|---|---|---|---|
| Quantity to still, g | 200 | 200 | 200 | 200 | 200 | 200 |
| HCHO concentration, per cent by weight | 5.0 | 10.0 | 10.0 | 10.0 | 18.7 | 18.7 |
| Acetone to still, g | 620 | 630 | 630 | 630 | 630 | 630 |
| Pressure, top of column, p. s. i. g. | 30–34 | 27 | 33 | 60 | 33 | 60 |
| Temperature, top of column, °C | 90 | 90 | 90 | 110 | 90 | 110 |
| Total product slurry: | | | | | | |
| Weight, g | 600 | 600 | 600 | 600 | 600 | 600 |
| HCHO concentration, per cent by weight | 1.63 | 3.26 | 3.26 | 3.20 | 6.05 | 5.92 |
| Formaldehyde polymer: | | | | | | |
| Weight, g | 9.1 | 17.0 | 18.7 | 6.3 | 34.7 | 15.2 |
| Water content, per cent by weight | 4.6 | 6.0 | 2.7 | 11.4 | 2.9 | 11.0 |
| HCHO content, per cent by weight | 95.4 | 94.0 | 97.3 | 88.6 | 97.1 | 89.0 |
| HCHO yield, based on total HCHO charged: | | | | | | |
| In total distillate, per cent by weight | 97.5 | 98.5 | 97.8 | 96.0 | 97.1 | 95.0 |
| As polymer, per cent by weight | 87 | 80 | 91 | 28 | 90 | 36 |

While the foregoing examples illustrate advantageous embodiments of my invention, it will be understood that I am not limited to the specific charging stocks, apparatus, manipulative steps, procedures, or operating conditions described therein. In general, it may be said that my invention is to be construed broadly within the terms of the description and the appended claims, and my invention is to be understood as including any modifications or equivalents that would ordinarily occur to those skilled in the art.

My invention represents a substantial advance in the art, by means of which it is now possible to obtain substantially purified formaldehyde as an overhead production of distillation, free from non-volatile impurities, and by means of which formaldehyde may be converted rapidly, conveniently, and economically into a solid polymer having desirable mechanical properties and high water solubility. In addition, my invention offers the further outstanding advantage that a high proportion of the total formaldehyde contained in a relatively dilute aqueous formaldehyde solution may be separated, purified, and converted directly to solid formaldehyde polymers of high quality without a preliminary concentration of the feed charge. Thus, it will be apparent that my invention represents a substantial advance, both technically and economically, over the processes of the prior art.

In accordance with the foregoing description, I claim as my invention:

1. In a process for separating formaldehyde from water, the steps which comprise fractionally distilling a mixture of formaldehyde and water in the presence of a liquid acetone reflux at an elevated pressure and at a temperature above about 80° C., and separating therefrom a formaldehyde fraction containing a diminished proportion of water.

2. A process for separating formaldehye from water comprising vaporizing said formaldehyde and water, passing the vapors upwardly through a fractionating column, providing an acetone reflux in said column while maintaining the top temperature of said column above about 80° C., and withdrawing overhead from said column substantially water-free acetone and formaldehyde.

3. A method for concentrating aqueous solutions of formaldehyde comprising passing vapors of said formaldehyde and water upwardly through a fractionating column, providing an acetone reflux in said column while maintaining the top temperature of said column above about 80° C., and withdrawing from the top of said column a product comprising acetone, formaldehyde, and water, and having a substantially increased ratio of formaldehyde to water.

4. In the process of claim 3, fractionally distilling the product from the top of said column in a second column while maintaining the top of said second column at a temperature below about 80° C., and withdrawing from the bottom of said second column a solution of formaldehyde in water substantially free from acetone.

5. In a process for separating formaldehyde from water, the steps which comprise fractionally distilling a mixture of formaldehyde and water in the presence of a liquid acetone reflux at an elevated pressure and at a temperature above about 80° C., withdrawing a vaporous formaldehyde fraction containing a diminished proportion of water, cooling and condensing said vaporous formaldehyde fraction, and separating solid polymeric formaldehyde therefrom.

6. A method for forming substantially anhydrous formaldehyde polymer from an aqueous solution of formaldehyde comprising fractionally distilling said solution in the presence of a liquid acetone reflux at an elevated pressure and at a top temperature above about 80° C., withdrawing overhead a stream comprising substantially water-free acetone and formaldehyde, cooling said stream to a temperature sufficient to cause precipitation of formaldehyde polymer, and separating said polymer from said acetone.

7. In a method for separating water from formaldehyde in which the mixture of water and formaldehyde is fractionally distilled in the presence of acetone at a temperature above about 80° C., the improvement comprising controlling the pressure in a selected range above 37 pounds per square inch absolute to provide an acetone-water azeotrope of the desired composition and thereby control the water content of the overhead product.

8. A process for concentrating formaldehyde solutions comprising distilling a dilute aqueous formaldehyde solution to form a first stream richer in formaldehyde than the feed and a second stream poorer in formaldehyde than the feed, fractionally distilling said second stream in the presence of a liquid acetone reflux at an elevated pressure and at a temperature above about 80° C., withdrawing overhead a third stream comprising acetone, water and formaldehyde having a substantially greater ratio of formaldehyde to water than said second stream, fractionally distilling said third stream at a temperature below about 80° C., withdrawing a fourth stream from the distillation of said third stream, said fourth stream being substantially free from acetone, and blending said first and said fourth streams to produce a formaldehyde solution of the desired concentration.

9. In a process for recovering formaldehyde in a substantially anhydrous condition from aqueous solutions thereof, the step which comprises contacting a vaporous mixture of formaldehyde and water with liquid acetone condensing at least a portion of said water vapor while maintaining the temperature above about 80° C. and separating the condensed water from the remaining vapors.

10. A method for concentrating aqueous solutions of formaldehyde comprising passing vapors of said formaldehyde and water upwardly through a fractionating column, contacting said vapors at a temperature above about 80° C. with sufficient liquid acetone reflux to condense a substantial portion of the water vapors, and withdrawing from the top of said column a product comprising acetone, formaldehyde and water having a substantially increased ratio of formaldehyde to water.

11. In a method for separating water from formaldehyde in which the mixture of water and formaldehyde is fractionally distilled in the presence of a liquid acetone reflux at a temperature above about 80° C., the improvement comprising carrying out the distillation at a pressure below 37 pounds per square inch absolute whereby an azeotrope of water and acetone is prevented from forming.

JAMES F. McCANTS.

REFERENCES CITED

The following references are of record in the file of this patent:

UNITED STATES PATENTS

| Number | Name | Date |
| --- | --- | --- |
| 1,905,033 | Bond | Apr. 25, 1933 |
| 1,948,069 | Fuchs et al. | Feb. 20, 1934 |
| 2,257,780 | Bludworth | Oct. 7, 1941 |
| 2,452,414 | Wong | Oct. 26, 1948 |
| 2,454,447 | Harney et al. | Nov. 23, 1948 |

OTHER REFERENCES

Horsley, "Table of Azeotropes and Non-Azeotropes," Analytical Chemistry, vol. 19, page 509 (August, 1947).